United States Patent
College

Patent Number: 5,614,158
Date of Patent: Mar. 25, 1997

[54] PROCESS FOR REMOVING SULFUR DIOXIDE FROM GASES AND PRODUCING GYPSUM AND PURIFIED MAGNESIUM HYDROXIDE

[75] Inventor: John W. College, Pittsburgh, Pa.

[73] Assignee: Dravo Lime Company, Pittsburgh, Pa.

[21] Appl. No.: 546,182

[22] Filed: Oct. 20, 1995

[51] Int. Cl.$^6$ .............................. C01F 5/40; C01B 17/22
[52] U.S. Cl. .............. 423/166; 423/243.08; 423/243.09; 423/243.1; 423/243.11; 423/638
[58] Field of Search ..................................... 423/164, 166, 423/169, 243.1, 243.11, 638, 243.08, 243.09

[56] References Cited

U.S. PATENT DOCUMENTS

| | | | |
|---|---|---|---|
| 3,637,347 | 1/1972 | Jowakiw et al. | 423/243.08 |
| 3,840,638 | 10/1974 | Morita et al. | 423/166 |
| 3,914,378 | 10/1975 | Selmeczi | 423/242 |
| 3,919,393 | 11/1975 | Selmeczi | 423/242 |
| 3,919,394 | 11/1975 | Selmeczi | 423/242 |
| 3,965,242 | 6/1976 | Morita et al. | 423/166 |
| 3,985,860 | 10/1976 | Mandelik et al. | 423/242 |
| 4,166,838 | 9/1979 | Tatani et al. | 423/242 |
| 4,193,971 | 3/1980 | Kawamata et al. | 423/243.11 |
| 4,294,807 | 10/1981 | Randolph | 423/242 |
| 4,490,341 | 12/1984 | Cares | 423/243.08 |
| 4,627,970 | 12/1986 | Kruger | 423/555 |
| 4,804,523 | 2/1989 | Abrams et al. | 423/242 |
| 4,874,591 | 10/1989 | Jewey | 423/243.08 |
| 4,976,936 | 12/1990 | Rathi et al. | 423/242 |
| 4,996,032 | 2/1991 | Stowe, Jr. et al. | 423/242 |
| 5,039,499 | 8/1991 | Stowe, Jr. | 423/242 |
| 5,082,639 | 1/1992 | Lee et al. | 423/242 |
| 5,084,255 | 1/1992 | College et al. | 423/242 |
| 5,266,285 | 11/1993 | Glancy et al. | 423/243.09 |
| 5,270,026 | 12/1993 | College et al. | 423/243.08 |
| 5,312,609 | 5/1994 | College | 423/243.08 |
| 5,439,658 | 8/1995 | Johnson | 423/243.07 |

*Primary Examiner*—Gary P. Straub
*Attorney, Agent, or Firm*—Armstrong, Westerman, Hattori, McLeland & Naughton

[57] ABSTRACT

In a process for removing sulfur dioxide from a gas stream using an aqueous solution of magnesium scrubbing components and subsequent oxidation of the magnesium sulfite produced which is regenerated by addition of lime, a pure magnesium hydroxide product is produced using less oxidation energy requirements by passing a further portion of solution from the oxidizing unit to a further oxidizing unit, oxidizing the same to produce an aqueous solution containing less than 130 ppm sulfite, treating the further portion with lime and separating purified magnesium hydroxide therefrom.

3 Claims, 1 Drawing Sheet

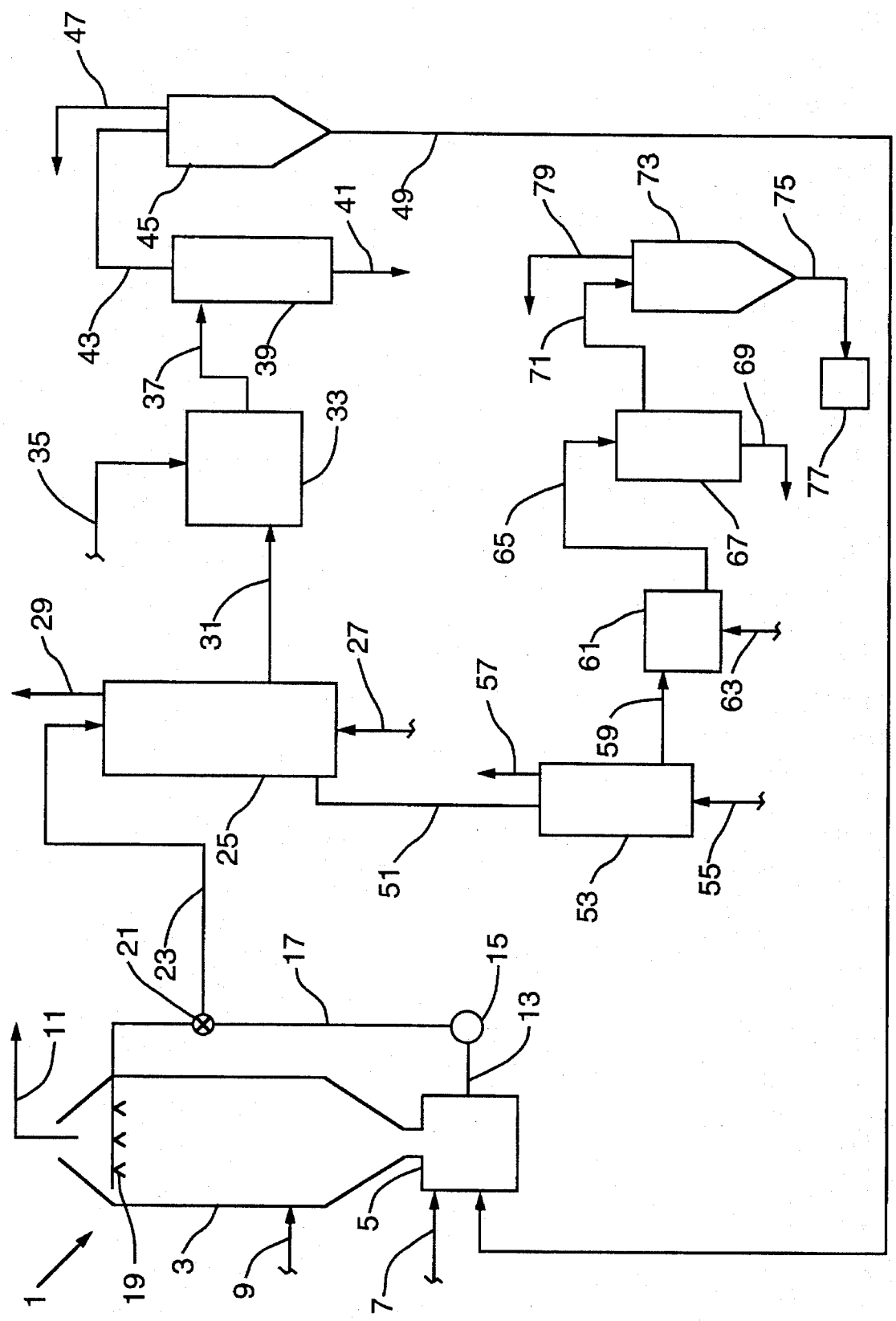

PROCESS FOR REMOVING SULFUR DIOXIDE FROM GASES AND PRODUCING GYPSUM AND PURIFIED MAGNESIUM HYDROXIDE

BACKGROUND OF THE INVENTION

The removal of sulfur dioxide from hot gaseous streams, such as hot combustion gases resulting from the burning of coal, has been effected by various wet scrubbing processes using as a scrubbing medium lime, magnesium-enhanced lime, or magnesium oxide or hydroxide. Wet scrubbing processes using magnesium-enhanced lime as a scrubbing medium are described, for example, in U.S. Pat. No. 3,919,393, U.S. Pat. No. 3,919,394, U.S. Pat. No. 3,914,378, and U.S. Pat. No. 4,976,936, all of which are assigned to the assignee of the present invention.

Another type of wet scrubbing system for removing sulfur dioxide from a hot gaseous stream uses a clear solution of magnesium scrubbing components without the presence of lime in the wet scrubbing unit. Such a system is described, for example, in U.S. Pat. No. 4,996,032, U.S. Pat. Nos. 5,039,499, 5,084,255 and U.S. Pat. No. 5,270,026, all of which are assigned to the assignee of the present invention, and the contents of all of which are incorporated by reference herein. In U.S. Pat. No. 5,039,499, a process is described wherein magnesium hydroxide is added to an aqueous scrubbing liquor to remove sulfur dioxide, with the scrubber effluent oxidized and then treated with a magnesium-containing lime slurry so as to regenerate magnesium hydroxide which is recycled to the wet scrubbing unit. U.S. Pat. No. 4,996,032, U.S. Pat. No. 5,084,255, and U.S. Pat. No. 5,270,026 teach additional treatment and recovery of components of the effluent from such a magnesium scrubbing system, so as to provide by-products in a more purified form. The provision of pure byproducts from such a magnesium scrubbing system encounters difficulties in that hydrocloning of by-product gypsum and magnesium hydroxide, resulting from the regeneration step, achieves a by-product containing about 70 percent magnesium hydroxide and 30 percent gypsum ($CaSO_4 \cdot 2H_2O$). Use of fresh water to dissolve the gypsum with subsequent separation of the magnesium hydroxide therefrom can produce a magnesium hydroxide by-product of a purity of about 91 percent. With such dissolution of gypsum, however, the magnesium hydroxide produced does not have good dewatering properties, with thickening provided a magnesium hydroxide solids content of only about 15 percent and filtering providing a magnesium hydroxide solids content of only about 30 percent. It would be very beneficial if a higher purity and higher solids content of magnesium hydroxide by-product from flue gas desulfurization systems could be achieved since the higher the purity and the higher the solids content, the more value that is attached to the product.

In the oxidation step, for example, where magnesium bisulfite and magnesium sulfite that are present in the bleed stream from the wet scrubbing system are oxidized to magnesium sulfate, which is subsequently reacted with lime to produce calcium sulfate and magnesium hydroxide, in order to guarantee high magnesium hydroxide purity the final sulfite concentration must be less than about 100 ppm (parts per million). Magnesium sulfite, when reacted with lime in the regeneration step, produces very fine crystals of calcium sulfite which can contaminate the magnesium hydroxide product. Also, while it is relatively easy to oxidize the magnesium sulfite to an extent which provides about 500–600 ppm residual magnesium sulfite in the magnesium sulfate produced, a stoichiometric ratio of about 2:1 (moles of oxygen used vs. moles of oxygen theoretically required) is needed for conversion to a resultant magnesium sulfite level of about 500 ppm. In order to provide a residual level of magnesium sulfite in the magnesium sulfate produced which would be about 100 ppm or below, the optimal value, a stoichiometric ratio of about 5:1 would be required, with the attendant cost and energy factors associated therewith. Thus, the power expenditure would be 2.5 times as much to provide a 100 mg magnesium sulfite level vs a 500 ppm magnesium sulfite level in the magnesium sulfate reporting from the oxidation step of the process.

In the magnesium scrubbing system, of which the present process is an improvement, about ninety to ninety-five percent of the magnesium hydroxide produced is returned to the scrubbing system, such as to the recycle tank of the wet scrubbing unit and thus does not have to be of high purity and may contain residual calcium sulfites without interfering with the scrubbing efficiency. It is only when a purified magnesium hydroxide is desired, for sale as a by-product of the process, that a level of sulfite of below 100 ppm is desired.

It is an object of the present invention to provide a process for removing sulfur dioxide from a gaseous stream using an aqueous solution of magnesium scrubbing components such as to produce a pure magnesium hydroxide by-product.

It is another object of the present invention to provide a process for removing sulfur dioxide from a gaseous stream using an aqueous solution of magnesium scrubbing components where a purified magnesium hydroxide by-product is produced while minimizing power costs required and reducing the size of the oxidizing unit necessary.

SUMMARY OF THE INVENTION

A process is provided for desulfurizing a sulfur dioxide-containing gas stream, such as a combustion gas stream from a power plant, in a wet scrubbing unit using an aqueous solution or suspension of magnesium scrubbing components, with production of a purified magnesium hydroxide by-product of the scrubbing system. A portion of the aqueous solution, after contact with the sulfur dioxide, is removed from the scrubbing loop and passed to an oxidizing unit to form an aqueous solution of magnesium sulfate which will contain a minor amount, usually more than about 500 ppm, of magnesium sulfite as impurities, due to incomplete oxidation. This aqueous solution of magnesium sulfate, containing the minor amount of magnesium sulfite, is contacted with lime to form calcium sulfate (gypsum), which is removed, and magnesium hydroxide containing a minor amount of resultant calcium sulfite, from reaction of the residual magnesium sulfite, is recycled to the scrubbing loop. In the present improved process, a further portion of the aqueous solution containing magnesium sulfate and the minor amount of magnesium bisulfite and magnesium sulfite is discharged from the oxidizing unit and treated to produce a purified magnesium hydroxide by-product. The further portion is passed to a further oxidizing unit and the minor amount of magnesium sulfites present therein is oxidized to magnesium sulfate so as to produce an aqueous solution of magnesium sulfate containing less than about 130 ppm of magnesium sulfite. The oxidized further solution is treated with lime to produce further calcium sulfate (gypsum) and further magnesium hydroxide. The calcium sulfate is separated therefrom to provide a purified aqueous solution of magnesium hydroxide containing less than 130 ppm of calcium sulfite as impurities.

BRIEF DESCRIPTION OF THE DRAWING

The invention will become more readily apparent from the following description of a preferred embodiment thereof shown, by way of example only, in the accompanying drawing which is a flow diagram illustrating an embodiment of the process of the present invention.

DETAILED DESCRIPTION

The present invention is an improvement over U.S. Pat. No. 5,039,499 which uses magnesium hydroxide addition to a wet scrubbing unit for contact with a sulfur dioxide-containing gas stream to remove the sulfur dioxide therefrom. In the wet scrubbing unit, the magnesium hydroxide is converted to magnesium bisulfite and magnesium sulfite by the following reactions:

(1) $Mg(OH)_2+SO_2 \rightarrow MgSO_3+H_2O$, (2) $MgSO_3+SO_2+H_2O \rightarrow Mg(HSO_3)_2$, and (3) $Mg(OH)_2+Mg(HSO_3)_2 \rightarrow 2MgSO_3+2H_2O$, with the scrubbing liquor comprising a clear solution with very a low solids content. The magnesium ion content of the aqueous solution in the wet scrubbing unit is generally between about 2000 to 15,000 parts per million and fresh or recycled magnesium hydroxide solution or suspension is added to the wet scrubbing unit to replenish that which is removed. The pH of the aqueous medium collected, in a hold or recycle tank, is generally at a pH of between 6.0 and 7.0 and most preferably in the range of about 6.0–6.5. The scrubbing solution, after passage through the wet scrubbing unit is collected in the hold or recycle tank, with a major portion of the solution then recycled to the wet scrubbing unit while a portion thereof is discharged therefrom so as to remove the sulfur reactants which are primarily magnesium sulfite and some magnesium bisulfite dissolved in the aqueous medium.

The portion of aqueous solution discharged from the system is then oxidized so as to convert the magnesium sulfite and magnesium bisulfite to magnesium sulfate. The resultant magnesium sulfate solution is subjected to a regeneration step where lime is added with the production of calcium sulfate (gypsum) and magnesium hydroxide. The calcium sulfate forms a precipitate which is removed from the aqueous magnesium hydroxide suspension. The aqueous magnesium hydroxide suspension is usually recycled to the wet scrubbing unit while some may be used elsewhere or as an intermediate for production of magnesium oxide as a saleable by-product.

In accordance with the present process, a further portion of the magnesium sulfate aqueous solution, containing magnesium sulfite as an impurity, is discharged from the oxidizing unit and further treated to produce a magnesium hydroxide by-product containing less than about 130 ppm of sulfites.

Referring now to the drawing, a wet scrubbing unit 1 is illustrated having a scrubbing section 3 and a hold or recycle tank 5. An aqueous solution of magnesium scrubbing components for removal of sulfur dioxide, such as magnesium oxide, magnesium hydroxide or magnesium bisulfite or sulfite is charged to the system such as adding it through line 7 to the recycle tank 5. A gaseous stream containing sulfur dioxide is charged to the wet scrubbing unit through line 9, passes countercurrent to the flow of aqueous solution, with sulfur dioxide removed by contact with the magnesium scrubbing components, and clean gas is discharged from the wet scrubbing unit 1 through outlet 11. The aqueous solution of magnesium scrubbing components leaving the scrubbing section 3 is recycled from the recycle tank 5, through line 13, pump 15, line 17 and sprayers 19 back to the scrubbing section 3 of the wet scrubbing unit 1.

A portion of the produced aqueous solution of magnesium sulfite and magnesium bisulfite is discharged from the wet scrubbing unit 1, such as through valve 21 in recycle line 17 and passed through line 23 to an oxidizing unit 25. In the oxidizing unit 25, the magnesium sulfite and magnesium bisulfite are oxidized, preferably in the presence of an oxidation catalyst such as an iron or manganese oxidizing catalyst, by air or oxygen introduced into the oxidizing vessel through line 27, and gases discharged therefrom through line 29. In the oxidizing unit 25, a magnesium sulfate aqueous solution is produced which will contain a minor amount, usually about 500 ppm or more, of magnesium sulfite, due to incomplete oxidation. This aqueous solution is discharged from the oxidation vessel through line 31 and fed to a regeneration tank 33. In the regeneration tank, the aqueous solution of magnesium sulfate is contacted with a lime slurry, such as a magnesium-containing lime slurry containing up to 6 percent magnesium hydroxide, charged through line 35 and the lime reacts with the magnesium sulfate to produce magnesium hydroxide and calcium sulfate, (gypsum) according to the reaction:

(4) $MgSO_4+Ca(OH)_2 \rightarrow Mg(OH)_2+CaSO_4 \cdot 2H_2O$.

The gypsum precipitates from the solution which is passed through line 37 to a solids separation unit 39. From the solids separation unit 39, the gypsum is discharged through line 41 while the magnesium hydroxide solution or suspension is passed through line 43 to a magnesium hydroxide concentration unit 45. Clarified liquor is removed from the magnesium hydroxide concentration unit 45 through line 47 and may be returned to the wet scrubbing unit 3. The concentrated magnesium hydroxide solution or suspension is returned to the wet scrubbing unit 3, such as by feeding the same through line 49 to the recycle tank 5. The concentrated magnesium hydroxide solution returned to the wet scrubbing unit 3 through line 49 will usually contain in excess of about 500 ppm of calcium sulfate as impurities, but such impurities do not affect the efficiency of the scrubbing operation.

In accordance with the present process, a further portion of aqueous solution containing magnesium sulfate and a minor amount, generally more than about 500 ppm, of magnesium sulfite is discharged from the oxidizing unit 25 through line 51. Preferably, about 90 percent or more of the aqueous solution from the scrubbing unit 25 is discharged through line 31, while about 10 percent or less, such as about 5 percent, is discharged through line 51.

The further portion of aqueous solution containing magnesium sulfate and a minor amount of more than about 500 ppm of magnesium sulfite is passed from line 51 to a further oxidizing unit 53. An oxidizing gas, such as air or oxygen, is charged to the further oxidizing unit 53 through line 55 and gases from the oxidizing unit 53 discharged through line 57. In the further oxidizing unit 53, the 500 ppm or more of magnesium sulfites present in the aqueous solution of magnesium sulfate are oxidized to further magnesium sulfate, such that the resultant aqueous solution will contain less than about 130 ppm of magnesium sulfite. The oxidized further portion is removed from the further oxidizing unit 53 through line 59 and charged to a further regeneration tank 61. In the further regeneration tank 61, the oxidized further portion is contacted with a further lime slurry, which is fed thereto through line 63, and the lime reacts with the further magnesium sulfate to produce further calcium sulfate (gypsum) and further magnesium hydroxide which is in a purified form. The effluent from further regeneration tank 61 is passed through line 65 to a further separation unit 67, with solids present removed from the further separation unit 67 as underflow through line 69. Overflow from the further separation unit 67 is passed through line 71 to a further magnesium hydroxide concentration unit 73. Concentrated purified magnesium hydroxide is removed, as underflow, from the further magnesium hydroxide separator 73 through line 75 and collected as a purified saleable product in a collection unit 77, while clarified aqueous solution is removed from the further magnesium hydroxide concentration unit 73 through line 79. The overflow in line 79 is primarily water with a very minor amount of solids, while the underflow in line 75 will be water containing about 15–20 percent magnesium hydroxide, and containing less than about 130 ppm of sulfites.

As an example of the benefits of the present process as compared with the process described in U.S. Pat. No. 5,039,499, the following data is pertinent. In the process of U.S. Pat. No. 5,039,499, the magnesium ion content ($Mg^{++}$) of the oxidizing unit would be about 5000 mg/l, while oxidation would be usually effected to provide a residual sulfite ($SO_3^=$) content of about 100 mg/l. The percent sulfite content of the magnesium hydroxide recirculated to the wet scrubbing unit would be about 1.33 percent and the percent sulfite in the product magnesium hydroxide produced would be about 1.33 percent. In order to achieve these values, the power consumed for oxidation, per ton of gypsum produced, would be about 136 (Kwhr/ton). Using the present process, the magnesium ion content of the oxidizing vessel (25) would still be about 5000 mg/l, but the oxidation would be effected only to a point where about 500 mg/l of sulfite were present. The further portion removed in line 51 would thus contain about 5000 mg/l $Mg^{++}$ and about 500 mg/l $SO_3^=$. In the further oxidizing unit 53, oxidation would be effected to a residual sulfite content of about 100 mg/l. The percent sulfite in the recirculated magnesium hydroxide (49) would be about 6.66 percent while the percent sulfite in the magnesium hydroxide product would be about 1.33 percent. By use of the present process, however, the power consumed per ton of gypsum made (both oxidizing unit 25 and further oxidizing unit 53) would be only 54.4 kwhr/ton. This is a significant savings in energy to produce a purified magnesium hydroxide product in a sulfur dioxide removal process.

What is claimed is:

1. In a process for desulfurizing a sulfur dioxide-containing gas stream where the gas stream is contacted, in a wet scrubbing unit, with an aqueous solution of magnesium scrubbing components which react with sulfur dioxide to form magnesiumسulfite and magnesium bisulfite, and a portion of the resultant aqueous solution containing magnesium sulfite and magnesium bisulfite is removed from the scrubber and oxidized in an oxidizing unit to form an aqueous solution of magnesium sulfate containing about 500–600 ppm of magnesium bisulfite and magnesium sulfite as impurities, with the aqueous solution of magnesium sulfate contacted with lime to form calcium sulfate, which is removed therefrom, and an aqueous suspension of magnesium hydroxide containing a minor amount of calcium sulfite which is returned to the wet scrubbing unit, the improvement comprising:

discharging a further portion of the aqueous solution containing said magnesium sulfate and about 500–600 ppm of magnesium bisulfite and magnesium sulfite from said oxidizing unit and passing the same to a further oxidizing unit wherein said minor amount of magnesium bisulfite and magnesium sulfite is oxidized to magnesium sulfate to produce an aqueous solution containing less than about 130 ppm magnesium sulfite;

treating the oxidized further portion with further lime to obtain further calcium sulfate and further magnesium hydroxide; and separating said further magnesium hydroxide from said further calcium sulfate of said further portion.

2. A process for desulfurizing a sulfur dioxide-containing gas stream as defined in claim 1 wherein said further portion of the aqueous solution discharged from the oxidizing unit comprises about five percent or less of the aqueous solution in said oxidizing unit.

3. In a process for desulfurizing a sulfur dioxide-containing gas stream where the gas stream is contacted, in a wet scrubbing unit, with an aqueous solution of magnesium scrubbing components which react with sulfur dioxide to form magnesium sulfite and magnesium bisulfite, and a portion of the resultant aqueous solution containing magnesium sulfite and magnesium bisulfite is removed from the wet scrubbing unit and oxidized in an oxidizing unit to form an aqueous solution of magnesium sulfate containing a minor amount of about 500–600 ppm of magnesium bisulfite and magnesium sulfite as impurities, with the aqueous solution of magnesium sulfate contacted with lime to form calcium sulfate, which is removed therefrom, and an aqueous suspension of magnesium hydroxide containing a minor amount of calcium sulfite which is returned to the wet scrubbing unit, the improvement comprising:

discharging a further portion of the aqueous solution containing said magnesium sulfate and about 500–600 ppm of magnesium bisulfite and magnesium sulfite, comprising about 10 percent or less of said aqueous solution, from said oxidizing unit and passing the same to a further oxidizing unit wherein said minor amount of magnesium bisulfite and magnesium sulfite is oxidized to magnesium sulfate to produce an aqueous solution containing less than about 130 ppm magnesium sulfite;

treating the oxidized further portion with further lime to obtain further calcium sulfate and further magnesium hydroxide; and separating said further magnesium hydroxide from said further calcium sulfate of said further portion.

\* \* \* \* \*